(12) United States Patent
Helin et al.

(10) Patent No.: US 9,548,912 B2
(45) Date of Patent: Jan. 17, 2017

(54) SYSTEM AND METHOD FOR SUPPORTING SMART BUFFER MANAGEMENT IN A DISTRIBUTED DATA GRID

(71) Applicant: Oracle International Corporation, Redwood Shores, CA (US)

(72) Inventors: Charlie Helin, New York, NY (US); Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 170 days.

(21) Appl. No.: 13/671,479

(22) Filed: Nov. 7, 2012

(65) Prior Publication Data

US 2014/0108760 A1    Apr. 17, 2014

Related U.S. Application Data

(60) Provisional application No. 61/714,100, filed on Oct. 15, 2012.

(51) Int. Cl.

| G06F 11/16 | (2006.01) |
|---|---|
| H04L 12/26 | (2006.01) |
| G06F 17/30 | (2006.01) |
| H04L 29/08 | (2006.01) |

(Continued)

(52) U.S. Cl.
CPC .......... *H04L 43/0811* (2013.01); *G06F 11/16* (2013.01); *G06F 11/2041* (2013.01); *G06F 11/2097* (2013.01); *G06F 17/30067* (2013.01); *G06F 17/30371* (2013.01); *H04L 67/1095* (2013.01); *G06F 11/2048* (2013.01); *G06F 2201/82* (2013.01); *H04L 41/0668* (2013.01)

(58) Field of Classification Search
CPC .. G06F 12/0253; G06F 11/16; G06F 11/2041; G06F 11/2097; G06F 17/30067; G06F 17/30371; G06F 11/2048; G06F 2201/82; H04L 43/0811; H04L 41/0668; H04L 67/1095

See application file for complete search history.

(56) References Cited

U.S. PATENT DOCUMENTS

| 5,014,265 A | 5/1991 | Hahne et al. |
|---|---|---|
| 5,301,350 A | 4/1994 | Rogan et al. |
| 5,561,785 A * | 10/1996 | Blandy et al. ................ 711/170 |

(Continued)

OTHER PUBLICATIONS

Andrew S. Tanenbaum, Computer Networks: Fourth Edition, Prentice Hall PTR, Upper Saddle River, NJ (2003), 6 pages.

(Continued)

*Primary Examiner* — Kevin Verbrugge
*Assistant Examiner* — Tahilba Puche
(74) *Attorney, Agent, or Firm* — Tucker Ellis LLP

(57) ABSTRACT

A system and method can support smart buffer management in a distributed data grid. A buffer manager in the distributed data grid can provide a plurality of buffers in a buffer pool in the distributed data grid, wherein the plurality of buffers are arranged in different generations and each buffer operates to contain one or more objects. The buffer manager can prevent a garbage collector from directly recycling the memory associated with each individual object in the buffer pool, and can allow the garbage collecting of one or more objects in one or more buffers in a particular generation to be performed together.

20 Claims, 3 Drawing Sheets

(51) Int. Cl.
*G06F 11/20* (2006.01)
*H04L 12/24* (2006.01)

(56) References Cited

U.S. PATENT DOCUMENTS

| | | | |
|---|---|---|---|
| 5,784,698 A | 7/1998 | Brady et al. | |
| 6,070,202 A * | 5/2000 | Minkoff et al. | 710/56 |
| 6,338,112 B1 | 1/2002 | Wipfel et al. | |
| 6,826,597 B1 | 11/2004 | Lonnroth et al. | |
| 7,058,055 B2 | 6/2006 | Mugica et al. | |
| 7,139,925 B2 | 11/2006 | Dinker et al. | |
| 7,707,513 B2 | 4/2010 | Broda et al. | |
| 7,861,249 B2 | 12/2010 | Jiang et al. | |
| 7,904,493 B2 * | 3/2011 | Schmelter | G06F 12/0253 |
| | | | 707/819 |
| 7,936,753 B1 | 5/2011 | Colloff et al. | |
| 8,024,445 B2 | 9/2011 | Kamijima et al. | |
| 8,122,006 B2 | 2/2012 | de Castro Alves et al. | |
| 8,131,894 B2 | 3/2012 | Cain et al. | |
| 8,166,095 B2 | 4/2012 | Ferwerda et al. | |
| 8,249,072 B2 | 8/2012 | Sugumar et al. | |
| 8,259,571 B1 | 9/2012 | Raphel et al. | |
| 8,271,980 B2 | 9/2012 | Jackson | |
| 8,290,919 B1 | 10/2012 | Kelly et al. | |
| 8,332,493 B2 | 12/2012 | Rowley et al. | |
| 8,392,368 B1 | 3/2013 | Kelly et al. | |
| 8,447,793 B2 * | 5/2013 | Burka | G06F 12/0253 |
| | | | 707/813 |
| 8,510,376 B2 | 8/2013 | Kaczmarski et al. | |
| 8,612,386 B2 | 12/2013 | Tien et al. | |
| 8,621,031 B2 | 12/2013 | Desai | |
| 8,687,636 B1 | 4/2014 | Sivan et al. | |
| 8,768,981 B1 | 7/2014 | Milne et al. | |
| 2002/0023173 A1 | 2/2002 | Jacobs et al. | |
| 2002/0196782 A1 | 12/2002 | Furukawa et al. | |
| 2004/0010674 A1 | 1/2004 | Boyd et al. | |
| 2004/0083317 A1 | 4/2004 | Dickson et al. | |
| 2004/0172618 A1 | 9/2004 | Marvin | |
| 2005/0249215 A1 | 11/2005 | Kelsey et al. | |
| 2006/0026169 A1 | 2/2006 | Pasqua | |
| 2006/0112174 A1 | 5/2006 | L'Heureux et al. | |
| 2006/0129516 A1 | 6/2006 | Bradford et al. | |
| 2006/0161893 A1 | 7/2006 | Han et al. | |
| 2006/0230128 A1 | 10/2006 | Chung et al. | |
| 2007/0168336 A1 | 7/2007 | Ransil et al. | |
| 2007/0230477 A1 | 10/2007 | Worley | |
| 2008/0208960 A1 | 8/2008 | Rowley et al. | |
| 2008/0320501 A1 | 12/2008 | Li et al. | |
| 2009/0077233 A1 | 3/2009 | Kurebayashi et al. | |
| 2009/0116484 A1 | 5/2009 | Buford | |
| 2009/0177914 A1 | 7/2009 | Winchell | |
| 2009/0219820 A1 | 9/2009 | Acke et al. | |
| 2009/0234897 A1 * | 9/2009 | Qi | G06F 12/023 |
| 2010/0005472 A1 | 1/2010 | Krishnaraj et al. | |
| 2010/0011414 A1 | 1/2010 | Banerjee et al. | |
| 2010/0017461 A1 | 1/2010 | Kokkevis et al. | |
| 2010/0037222 A1 | 2/2010 | Tatsubori et al. | |
| 2010/0042755 A1 * | 2/2010 | Fuente | G06F 13/28 |
| | | | 710/22 |
| 2010/0060934 A1 | 3/2010 | Bellert | |
| 2010/0093441 A1 | 4/2010 | Rajaraman et al. | |
| 2010/0125624 A1 | 5/2010 | Bachhuber-Haller et al. | |
| 2010/0265945 A1 | 10/2010 | Bejerano et al. | |
| 2010/0287216 A1 * | 11/2010 | Ylonen | G06F 12/0253 |
| | | | 707/813 |
| 2010/0333099 A1 | 12/2010 | Kupferschmidt et al. | |
| 2011/0004701 A1 | 1/2011 | Panda et al. | |
| 2011/0055322 A1 | 3/2011 | Gregersen | |
| 2011/0137991 A1 | 6/2011 | Russell | |
| 2011/0225120 A1 | 9/2011 | Cooper et al. | |
| 2011/0225121 A1 | 9/2011 | Cooper et al. | |
| 2011/0225122 A1 | 9/2011 | Denuit et al. | |
| 2011/0246550 A1 | 10/2011 | Levari et al. | |
| 2011/0296052 A1 | 12/2011 | Guo et al. | |
| 2012/0113896 A1 | 5/2012 | Karol | |
| 2012/0144025 A1 | 6/2012 | Melander et al. | |
| 2012/0197840 A1 | 8/2012 | Oliver et al. | |
| 2012/0197959 A1 * | 8/2012 | Oliver et al. | 709/201 |
| 2012/0198455 A1 | 8/2012 | Lee et al. | |
| 2012/0278398 A1 | 11/2012 | Lowekamp | |
| 2012/0331029 A1 | 12/2012 | King, III et al. | |
| 2013/0014114 A1 | 1/2013 | Nagata | |
| 2013/0041969 A1 | 2/2013 | Falco et al. | |
| 2013/0073809 A1 | 3/2013 | Antani et al. | |
| 2013/0074101 A1 | 3/2013 | Oliver et al. | |
| 2013/0103837 A1 | 4/2013 | Krueger | |
| 2013/0128726 A1 | 5/2013 | Hellhake et al. | |
| 2013/0262632 A1 | 10/2013 | Fein | |
| 2013/0325543 A1 | 12/2013 | Magee et al. | |
| 2014/0016457 A1 | 1/2014 | Enyedi et al. | |
| 2014/0219209 A1 | 8/2014 | Soneda et al. | |

OTHER PUBLICATIONS

Martin Sustrik, [zeromq-dev] Subports, Grokbase, Jul. 2011, 6 pages <http://grokbase.com/t/zeromq/zeromq-dev/117vwvr6z9/subports>.

Class SocketChannel, Java™ 2 Platform Standard Ed. 5.0, Copyright © 2004, 2010 Oracle Int'l Corp., 12 pages. <http://docs.oracle.com/javase/1.5.0/docs/api/java/nio/channels/SocketChannel.html>.

Tanenbaum, Andrew S., "*Modern operating systems*" Prentice-Hall, Inc., Upper Saddle River, New Jersey, 2001. 5 pages.

Tanenbaum, Andrew S., Computer Networks, Fourth Edition 2003, Prentice Hall PTR, Chapter 5.2.7 Broadcast Routing, 3 pages.

D. Johnson et al., Network Working Group, RFC 4728; "The Dynamic Source Routing Protocol (DSR) for Mobile Ad Hoc Networks for IPv4", Microsoft Research Feb. 2007, 107 Pages.

* cited by examiner

SYSTEM AND METHOD FOR SUPPORTING SMART BUFFER MANAGEMENT IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

CROSS-REFERENCED APPLICATIONS

The current application hereby incorporates by reference the material in the following patent applications:

U.S. patent application Ser. No. 13/671,441, entitled "SYSTEM AND METHOD FOR PROVIDING A FLEXIBLE BUFFER MANAGEMENT INTERFACE IN A DISTRIBUTED DATA GRID", by inventors Charlie Helin, and Mark Falco, filed Nov. 7, 2012 (now U.S. Pat. No. 8,874,811 issued Oct. 28, 2014).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein is a system and method that can support smart buffer management in a distributed data grid. A buffer manager in the distributed data grid can provide a plurality of buffers in a buffer pool in the distributed data grid, wherein the plurality of buffers are arranged in different generations and each buffer operates to contain one or more objects. The buffer manager can prevent a garbage collector from directly recycling the memory associated with each individual object in the buffer pool, and can allow the garbage collecting of one or more objects in one or more buffers in a particular generation to be performed together

DETAILED DESCRIPTION

Figure 1:
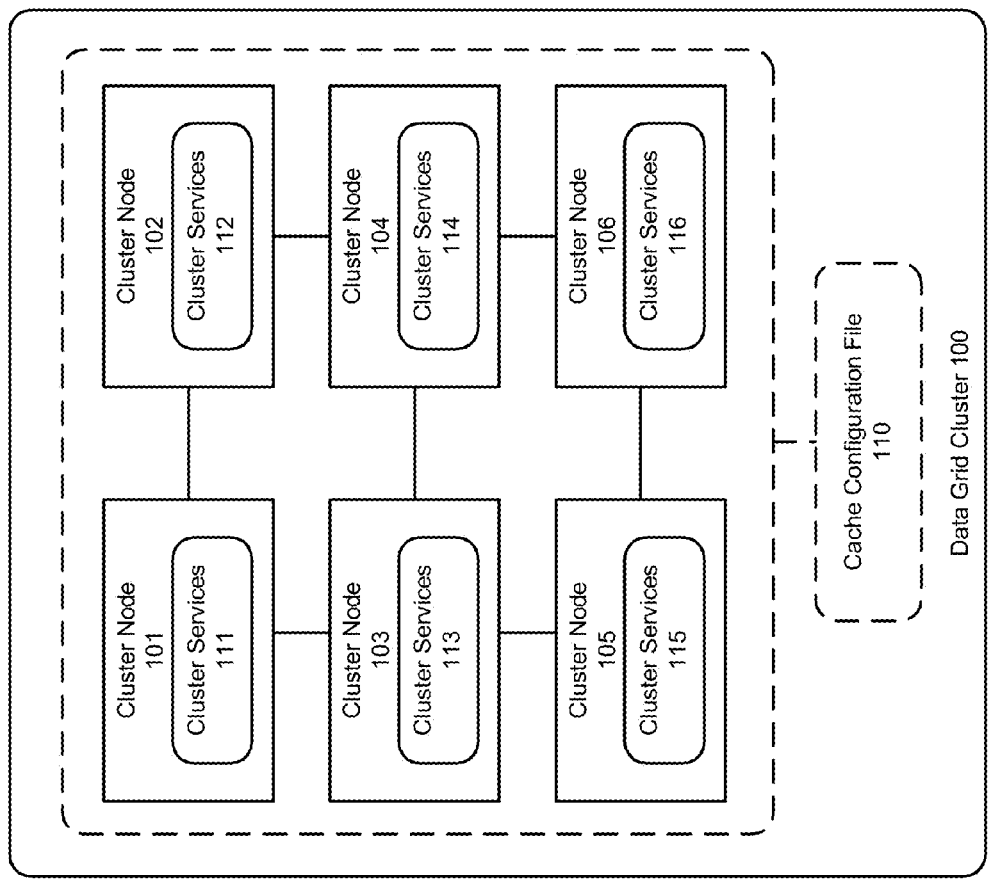
FIG. 1 is an illustration of a data grid cluster in accordance with various embodiments of the invention.

Described herein is a system and method that can support smart buffer management in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Smart Buffer Management

In accordance with an embodiment of the invention, the distributed data grid supports smart buffer management that can be beneficial for data grid operations, such as supporting object serialization and network input/output (I/O) for various applications.

Figure 2:
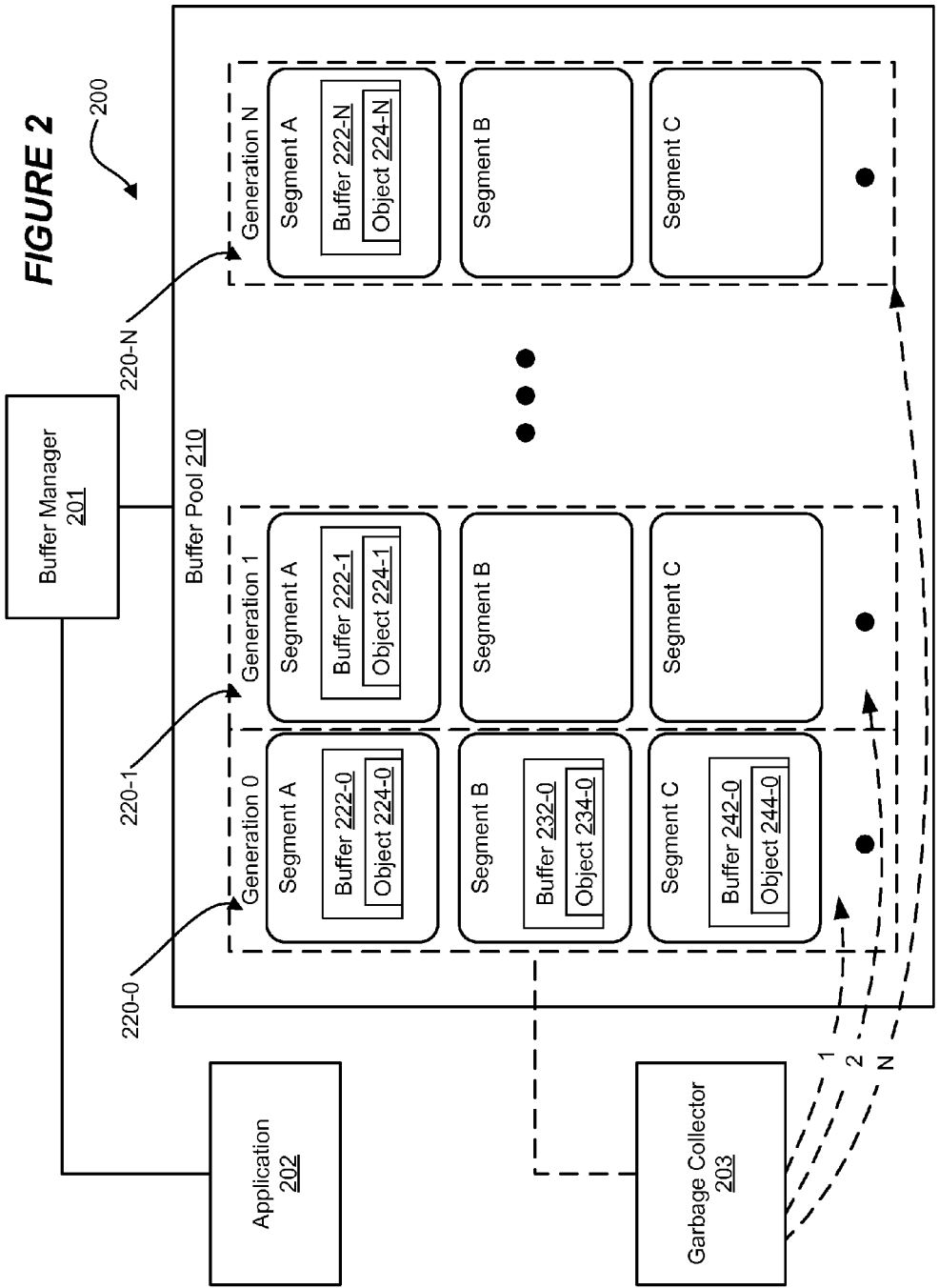
FIG. 2 shows an illustration of supporting smart buffer management in a data grid cluster, in accordance with an embodiment of the invention.

FIG. 2 shows an illustration of supporting smart buffer management in a data grid cluster, in accordance with an embodiment of the invention. As shown in FIG. 2, a data grid cluster 200 can use a buffer manager 201 to manage a buffer pool 210.

The buffer pool 210 contains a plurality of buffers (222-0, 232-0, 242-0, 222-1, and 222-N), each of which can contain one or more objects (224-0, 234-0, 244-0, 224-1, and 224-N) for one or more applications 202. Each buffer (222-0, 232-0, 242-0, 222-1, or 222-N) can be a shared buffer that holds a byte buffer data structure, and the shared buffer can be released back to the buffer manager 201 when a reference count reaches zero.

Furthermore, the plurality of buffers (222-0, 232-0, 242-0, 222-1, and 222-N) can be arranged in different generations, e.g. from generation 0 to generation N. Also, within each generation, there can be multiple segments, e.g. Segment A to Segment C. The buffer manager 201 can manage the buffers (222-0, 232-0, 242-0, 222-1, and 222-N) in the buffer pool 210 based on the generation concept, i.e. the buffer manager 201 can allocate or release memory (220-0, 220-1, 220-N) for the buffers (222-0, 232-0, 242-0, 222-1, and 222-N) in a particular generation (Generation-0, Generation-1, or Generation-N) at the same time.

For example, the buffer manager 201 can initially create a buffer pool 210 with no buffer. When the buffer manager 201 receives a first request for a buffer from a requester, e.g. application 202, the buffer manager 201 can allocate a portion of the memory 220-0, e.g. 10% of the total memory under the buffer pool 210, for creating the generation 0 buffers in one operation. Then, the buffer manager 201 can create a generation 0 buffer 222-0 from the allocated memory 220-0 and return the allocated buffer 222-0 to the requester. Thus, the memory for buffers in a same generation can be kept close (addresswise) to each other in the memory.

Furthermore, in order to serve the incoming buffer requests, the buffer manager 201 can allocate buffers in a new generation, before reaching the maximum limit for the buffer pool 210, if all the current generations are full. Thus, if generation 0 is full, when the buffer manager 201 receives another request for a buffer, the buffer manager 201 can allocate a portion of the memory 220-1, e.g. 10% of the total memory under the buffer pool 210, for creating the generation 1 buffers in one operation. Then, the buffer manager 201 can create a generation 1 buffer 222-1 from the allocated memory 220-1 and return the allocated buffer 222-1 to the requester. If all generations before generation N are full, when the buffer manager 201 receives another request for a buffer, the buffer manager 201 can allocate a portion of the memory 220-N, e.g. 10% of the total memory under the buffer pool 210, for creating the generation N buffers in one operation. Then, the buffer manager 201 can create a generation N buffer 222-N from the allocated memory 220-N and return the allocated buffer 222-N to the requester.

Additionally, the buffer pool 210 can prevent a garbage collector 203 from directly recycling memory associated with each individual object in the buffer pool 210. The buffer pool 210 can be beneficial for handling large objects with medium length life cycle, e.g. in the tenured space of JAVA heap.

On the other hand, the garbage collectors 203 are preferable for handling small objects with short life cycle. For example, the garbage collector 203 may treat the objects with medium length life cycle as permanent objects. The garbage collector 203 may only try to recycle the memory for the objects with medium length life cycle at the time when a full garbage collection operation is performed. Thus, the memory usage may become inefficient since these objects can become garbage sooner than a full garbage collection operation is performed.

Also, from the perspective of a garbage collector 203, the objects in the buffer pool 210 are garbage collection friendly, since there are generally a limited number of large objects in the buffer pool 210, and the memory for these objects are close (addresswise) to each other. Additionally, these objects are terminal objects that do not reference other objects.

In accordance with an embodiment of the invention, the system allows the garbage collector 203 to recycle the memory allocated for the buffers in different generations according to seniority, or the generation number as shown by arrows 1, 2, and N from garbage collector 203 in FIG. 2. For example, the buffer pool 210 can allow the garbage collector 203 to first recycle memory for one or more buffers in the youngest generation, when the pool reaches a limit. One reason is that the memory associated with the older generation buffers may have already been defragmented, thus, tends to be more garbage collection friendly.

Furthermore, buffers in a particular generation, e.g., generation 15 in Coherence, can be non-pooled buffers. Each non-pooled buffer can be created separately upon request and may be garbage collected as soon as it is dereferenced in the application 202. Additionally, when the buffer pool 210 reaches its limit, the buffer pool 210 automatically looks for the non-pooled buffers and try to garbage collect them if possible.

Each individual buffer can be implemented based on a standard byte buffer or byte array defined in an object oriented programming language, e.g. JAVA. The system can use the size of a buffer, e.g. the last two digit of the size number, as an implicit generation identifier that indicates which generation the buffer is in. For example, the system can allocate a chunk of memory with 1024 K bytes for generation 0 buffers, a chunk of memory with 1025 K bytes for generation 1 buffers, and a chunk of memory with 1026 K bytes for generation 2 buffers.

In accordance with an embodiment of the invention, the plurality of buffers can also be arranged in different segments (e.g. Segment A, Segment B, and Segment C), with different buffers in a same segment having a same size. For example, the system can create the buffers in small, medium, and large segments. Thus, the buffer manager 201 can provide a suitable buffer (222-0, 232-0, 242-0 operative to contain one or more objects 224-0, 234-0, 244-0) in a particular segment, e.g. a buffer 232-0 in segment B in generation 0, according to the need of the requester 202.

Within each segment, there can be different queues, each of which can be associated with a different thread. For example, there can be 24 queues in each segment for a distributed data grid running on a 24 core machine. Thus, the buffer pool 210 can be accessed and managed concurrently via the different queues on different threads.

Figure 3:
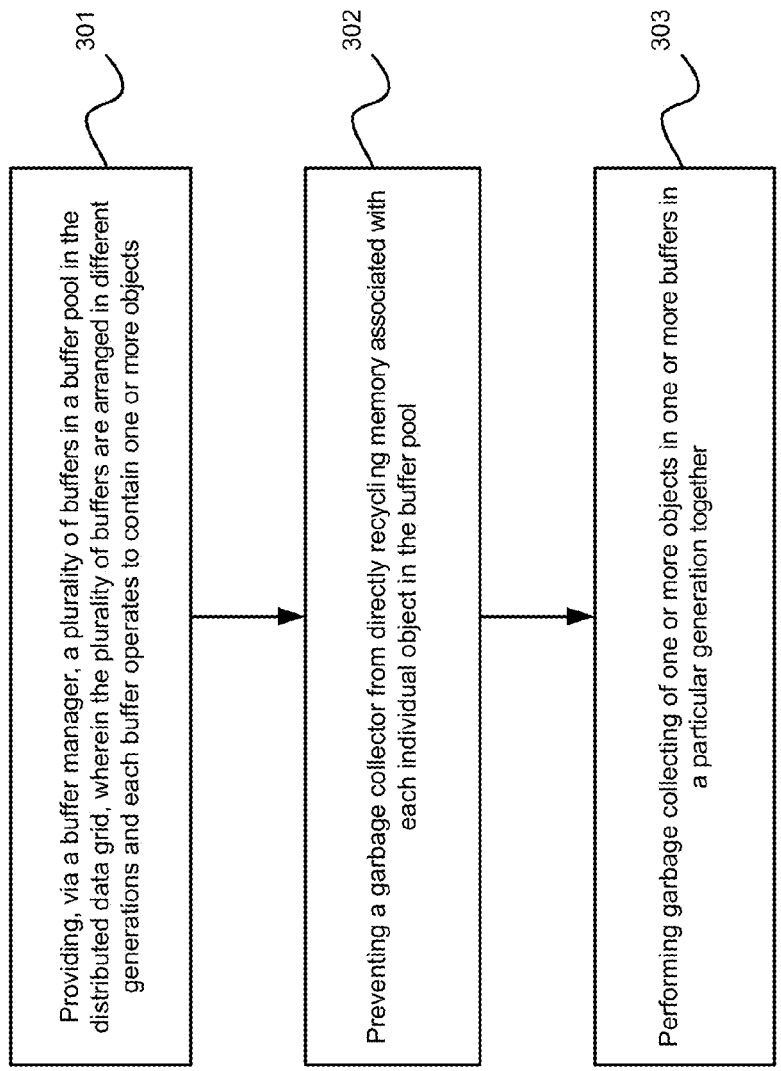
FIG. 3 illustrates an exemplary flow chart for supporting smart buffer management in a data grid cluster, in accordance with an embodiment of the invention.

FIG. 3 illustrates an exemplary flow chart for supporting smart buffer management in a data grid cluster, in accordance with an embodiment of the invention. As shown in FIG. 3, at step 301, a buffer manager can provide a plurality of buffers in a buffer pool in the distributed data grid, wherein the plurality of buffers are arranged in different generations and each buffer operates to contain one or more objects. Furthermore, at step 302, the buffer pool can prevent a garbage collector from directly recycling memory associated with each individual object in the buffer pool. Then, at step 302, the buffer pool allows the garbage collecting of one or more objects in one or more buffers in a particular generation to be performed together.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for managing buffers in a distributed data grid, comprising:
   providing, a buffer manager, configured to manage a buffer pool associated with a memory;
   receiving a first request for a first buffer;
   in response to receiving said first request, using said buffer manager to allocate a first generation portion of said memory associated with said buffer pool in which to create said first buffer;
   receiving from requestors a first plurality of requests for buffers and creating first generation buffers in the first generation portion of said memory in response to said first plurality of requests;
   after said first generation portion of said memory is full, using said buffer manager to allocate a second generation portion of said memory associated with said buffer pool;
   receiving from requestors a second plurality of requests for buffers and creating second generation buffers in the second generation portion of said memory in response to said second plurality of requests;
   after said second generation portion of said memory is full, using said buffer manager to allocate a subsequent generation portion of said memory associated with said buffer pool;
   receiving from requestors a subsequent plurality of requests for buffers and creating subsequent generation buffers in the subsequent generation portion of said memory in response to said subsequent plurality of requests;
   recycling said first, second, and subsequent generation portions of said memory according to seniority by garbage collecting said first generation buffers, prior to garbage collecting said second generation buffers, and garbage collecting said second generation buffers, prior to garbage collecting said subsequent generation buffers.

2. The method according to claim 1, further comprising:
   implementing each individual buffer based on a standard byte buffer defined in an object oriented programming language.

3. The method according to claim 1, further comprising:
   using a size of a buffer in a generation as an implicit generation identifier that indicates which generation the buffer is in.

4. The method according to claim 1, wherein said garbage collecting of said first generation buffers is performed after the buffer pool reaches a limit of said memory.

5. The method according to claim 1, further comprising:
   using said first generation buffers to support at least one of object serialization and network input/output.

6. The method according to claim 1, further comprising:
   allowing each of said first generation buffers to be a shared buffer that holds a byte buffer data structure, wherein the shared buffer is released back to the buffer manager when a reference count reaches zero.

7. The method according to claim 1, further comprising:
   using the buffer manager to define a plurality of segments in each of the first generation portion of said memory, second generation portion of said memory, and said subsequent generation portion of said memory, wherein the buffer manager creates buffers in different segments of said plurality of segments depending upon buffer size.

8. The method according to claim 1, further comprising:
   using the buffer manager to define small, medium, and large of segments in each of the first generation portion of said memory, second generation portion of said memory, and subsequent generation portion of said memory, wherein the buffer manager creates small buffers in said small segments, medium buffers in said medium segments, and large buffers in said large segments.

9. A non-transitory computer readable medium having instructions stored thereon for managing buffers in a distributed data grid, which instructions when executed cause the distributed data grid to perform steps comprising:
   providing, a buffer manager, configured to manage a buffer pool associated with a memory;
   receiving a first request for a first buffer;

in response to receiving said first request, using said buffer manager to allocate a first generation portion of said memory associated with said buffer pool;

receiving from requestors a first plurality of requests for buffers and creating first generation buffers in the first generation portion of said memory in response to said first plurality of requests;

after said first generation portion of said memory is full, using said buffer manager to allocate a second generation portion of said memory associated with said buffer pool;

receiving from requestors a second plurality of requests for buffers and creating second generation buffers in the second generation portion of said memory in response to said second plurality of requests;

after said second generation portion of said memory is full, using said buffer manager to allocate a subsequent generation portion of said memory associated with said buffer pool;

receiving from requestors a subsequent plurality of requests for buffers and creating subsequent generation buffers in the subsequent generation portion of said memory in response to said subsequent plurality of requests;

recycling said first, second, and subsequent generation portions of said memory according to seniority by garbage collecting said first generation buffers, prior to garbage collecting said second generation buffers, and garbage collecting said second generation buffers, prior to garbage collecting said subsequent generation buffers.

10. The non-transitory computer readable medium of claim 9, wherein said steps further comprise:
implementing each individual buffer based on a standard byte buffer defined in an object oriented programming language.

11. The non-transitory computer readable medium of claim 9, wherein said steps further comprise:
using a size of a buffer in a generation as an implicit generation identifier that indicates which generation the buffer is in.

12. The non-transitory computer readable medium of claim 9, wherein said garbage collecting objects in said first generation buffers is performed after the buffer pool reaches a limit of said memory.

13. The non-transitory computer readable medium of claim 9, wherein said steps further comprise:
using said first generation buffers, second generation buffers, and subsequent generation buffers to support at least one of object serialization and network input/output.

14. The non-transitory computer readable medium of claim 9, wherein each buffer of said first generation buffers, second generation buffers, and subsequent generation buffers is a shared buffer that holds a byte buffer data structure, wherein the shared buffer is released back to the buffer manager when a reference count reaches zero.

15. The non-transitory computer readable medium of claim 9, wherein said steps further comprise:
using the buffer manager to define a plurality of segments in each of the first generation portion of memory, second generation portion of said memory, and subsequent generation portion of said memory, wherein the buffer manager allocates buffers in different segments of said plurality of segments depending upon buffer size.

16. The non-transitory computer readable medium of claim 9, wherein said steps further comprise:
using the buffer manager to define small, medium, and large of segments in each of the first generation portion of said memory, second generation portion of said memory, and subsequent generation portion of said memory, wherein the buffer manager allocates small buffers in said small segments, medium buffers in said medium segments and large buffers in said large segments.

17. A system for managing buffers in a distributed data grid, the system comprising:
a computer system comprising a microprocessor and a memory;
a buffer manager operating on said computer system and, configured to manage a buffer pool associated with said memory;
a garbage collector operating on said computer system operative to recycle said memory of said buffer pool;
wherein said buffer manager is configured to,
receive a first request for a first buffer;
in response to receiving said first request, allocate a first generation portion of said memory associated with said buffer pool,
receive from requestors a first plurality of request for buffers and create first generation buffers in the first generation portion of said memory in response to said first plurality of requests,
after said first generation portion of said memory is full, allocate a second generation portion of said memory associated with said buffer pool,
receive from requestors a second plurality of request for buffers and create second generation buffers in the second generation portion of said memory in response to said second plurality of requests,
after said second generation portion of said memory is full, allocate a subsequent generation portion of said memory associated with said buffer pool,
receive from requestors a subsequent plurality of request for buffers and create subsequent generation buffers in the subsequent generation portion of said memory in response to said second plurality of requests; and
wherein the garbage collector is configured to recycle memory associated with said first, second, and subsequent generations according to seniority such that the garbage collector garbage collects said first generation buffers, prior to garbage collecting said second generation buffers, and garbage collect said second generation buffers, prior to garbage collecting said subsequent generation buffers.

18. The system of claim 17, wherein said buffer manager is configured to use a size of a buffer in a generation as an implicit generation identifier that indicates which generation the buffer is in.

19. The system of claim 17, wherein the buffer manager is configured to define small, medium, and large of segments in each of the first generation portion of said memory, second generation portion of said memory, and subsequent generation portion of said memory, and allocate small buffers in said small segments, medium buffers in said medium segments and large buffers in said large segments.

20. The system of claim 17, wherein said first generation buffers, second generation buffers, and subsequent generation buffers support object serialization and network input/output.

* * * * *